United States Patent [19]

Nippoldt

[11] Patent Number: 4,952,919
[45] Date of Patent: Aug. 28, 1990

[54] TRACKBALL MECHANISM

[75] Inventor: Reuben E. Nippoldt, Portland, Oreg.

[73] Assignee: Tektronix, Inc., Beaverton, Oreg.

[21] Appl. No.: 334,262

[22] Filed: Apr. 6, 1989

[51] Int. Cl.⁵ .............................................. G09G 5/00
[52] U.S. Cl. .................................. 340/710; 340/706; 74/471 XY; 273/148 B
[58] Field of Search ............... 340/706, 709, 710; 74/471 XY, 198, 206, 471 R; 273/148 B, DIG. 28; 244/236, 237; 16/26; 364/188, 190; 338/15, 128; 33/1 M; 250/221

[56] References Cited

U.S. PATENT DOCUMENTS

| | | | |
|---|---|---|---|
| 3,643,148 | 2/1972 | Brown et al. | 273/148 B |
| 4,538,476 | 9/1985 | Luque | 340/710 |
| 4,562,347 | 12/1985 | Hovey et al. | 340/710 |
| 4,581,609 | 4/1986 | Hosogoe et al. | 340/710 |
| 4,785,180 | 11/1988 | Dietrich et al. | 250/231 |

OTHER PUBLICATIONS

Measurement Systems, Inc.; Catalog C585 "Positioning and Tracking Controls For the Human Operator".
Two page brochure produced by CIS Group, entitled "The New Geometry Ball Series of the Dimension 6 Family of 3-D Control Devices."

Primary Examiner—Jeffery A. Brier
Attorney, Agent, or Firm—Patrick W. Hughey; Francis I. Gray

[57] ABSTRACT

A trackball-type input device (10) uses a retainer (114) to secure a ball (80) to a housing (12) so that a large segment (164) of the ball (80) protrudes from the housing (12) for manipulation by the user, thereby affording precise control over rotational movement of the ball (80).

31 Claims, 3 Drawing Sheets

TRACKBALL MECHANISM

TECHNICAL FIELD

This invention pertains to trackball-type input devices for graphics display systems.

BACKGROUND INFORMATION

Input devices for modern graphics display systems permit the user to alter a displayed image. One such input device is known as a trackball. A conventional trackball includes a rigid ball that is rotatably mounted within a housing. A portion of the ball extends through an opening in the housing and is exposed to the user.

Motion sensors are mounted within the housing to detect movement of the ball. Whenever a user rotates the ball by manipulating its exposed portion, the motion sensors generate output signals that are representative of the direction and magnitude of the ball rotation. The output signals are supplied to the display controller and the displayed image is changed (for example, rotated) in response to those signals.

The housings of prior trackballs are configured so that more than half of the ball is enclosed therein. Further, the opening through which the exposed portion of the ball extends has a diameter that is smaller than that of the ball. The ball remains secured to the housing because it cannot pass through the relatively smaller diameter opening.

The just-described means for securing the ball to the trackball housing, although effective, necessarily limits the amount of surface area that can be exposed for manipulation by the user. Oftentimes, less than one-third of the ball surface area is exposed. This limited exposed surface area of the ball makes the ball difficult to grasp. Accordingly, the user finds it difficult to control fine rotational movement of the ball to produce correspondingly fine changes in the displayed image.

SUMMARY OF THE INVENTION

This invention is directed to a trackball mechanism that is configured and arranged so that a large segment of the ball is exposed for grasping between the user's thumb and finger. More particularly, the ball is rotatably o 15 mounted in a housing that is configured so that more than 50% of the ball surface area protrudes above the housing. A retainer is attached to one side of the housing for securing the ball to the housing. The retainer is sized to secure the ball, while permitting the ball to be grasped at diametrically opposed portions of the ball surface. Accordingly, the user can precisely control the fine rotational motion of the ball.

The trackball mechanism of the present invention is particularly useful when three motion detectors are used to detect motion of the ball about three orthogonal axes. In this regard, the retainer is shaped to define a space adjacent to the ball for enclosing one of the sensors.

The retainer is arranged to minimally interfere with the user's manipulation of the ball. To this end, the retainer is positioned to be near the palm of the user's hand whenever the user manipulates the ball with his fingers.

BRIEF DESCRIPTIONS OF THE DRAWINGS

DESCRIPTION OF PREFERRED EMBODIMENT

Figure 1:
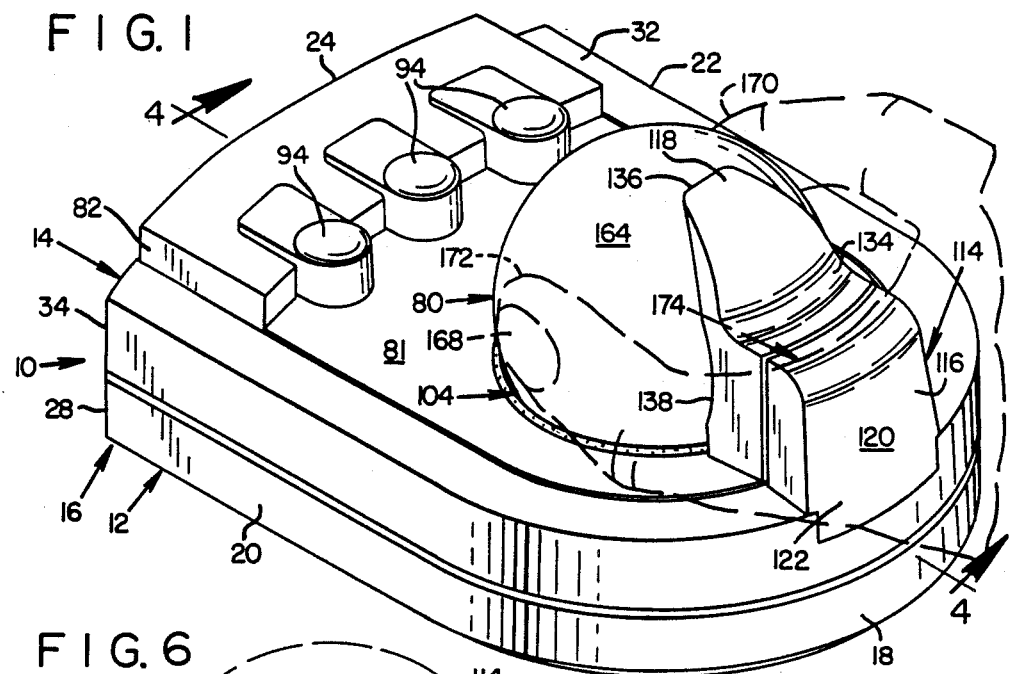
FIG. 1 is a perspective view of the trackball mechanism formed in accordance with the present invention.

With reference to FIGS. 1-6, the trackball mechanism 10 of the present invention includes a housing 12 in which is rotatably mounted a ball 80. The ball 80 is held in place by a retainer 114. The user grasps the ball 80 with the retainer 114 near the palm 174 of the hand. Rotation of the ball 80 by the user generates input signals for a graphics display controller (not shown). Keys 94 are also mounted to the housing 12 and may be pressed to alter the function of the trackball mechanism 10.

Turning to the particulars of the present invention, the housing 12 includes a top shell 14 and a bottom shell 16. The housing 12 is generally U-shaped in plan view (FIG. 5), having a curved front 18, a straight left side 20, a straight right side 22, and a slightly curved back 24.

The bottom shell 16 has a flat bottom plate 26. A contiguous sidewall 28 is formed at the edge of the bottom plate 26 to project upwardly therefrom. The portion of the sidewall 28 that is adjacent to the bottom plate 26 is stepped, thereby defining an internal recess 30 at the bottom of the housing 12.

Figure 6:
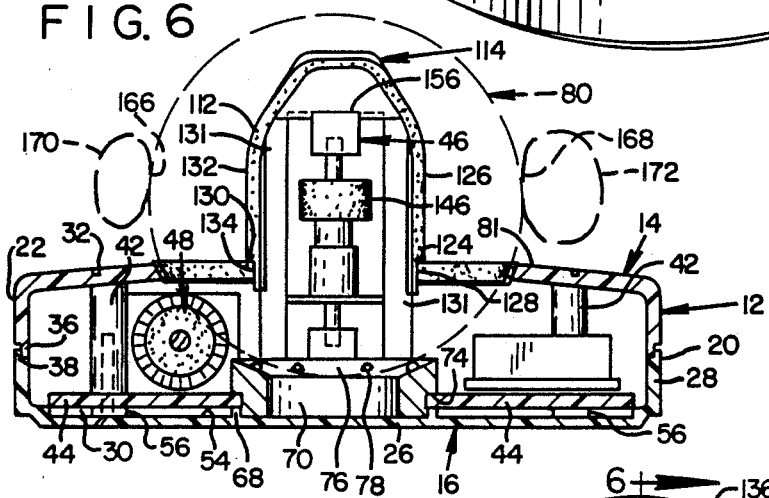
FIG. 6 is a section view of the trackball mechanism taken along line 6—6 of FIG. 2. For clarity, the ball is shown in broken line.

The top shell 14 has a top plate 32 that has a contiguous sidewall 34 projecting downwardly from the edge thereof. The lowermost edge 36 of the top plate sidewall 34 is rabbeted to mate with the correspondingly rabbeted uppermost edge 38 of the bottom plate sidewall 28 (FIG. 6).

The top shell 14 is secured to the bottom shell 16 by fasteners 40, the heads of which are countersunk into the underside of the bottom plate 26. The shafts of the fasteners 40 are received within the threaded bores of cylindrical spacers 42 that are attached to the underside of the top plate 32.

A circuit board 44 fits over the recess 30 formed in the bottom plate 26. The circuit board 44 carries motion sensors 46, 48, 50 and other conventional circuit components 52 for processing the output signals of the motion sensors 46, 48, 50 as the sensors move in response to movement of the ball 80, as described more fully below.

Figure 3:
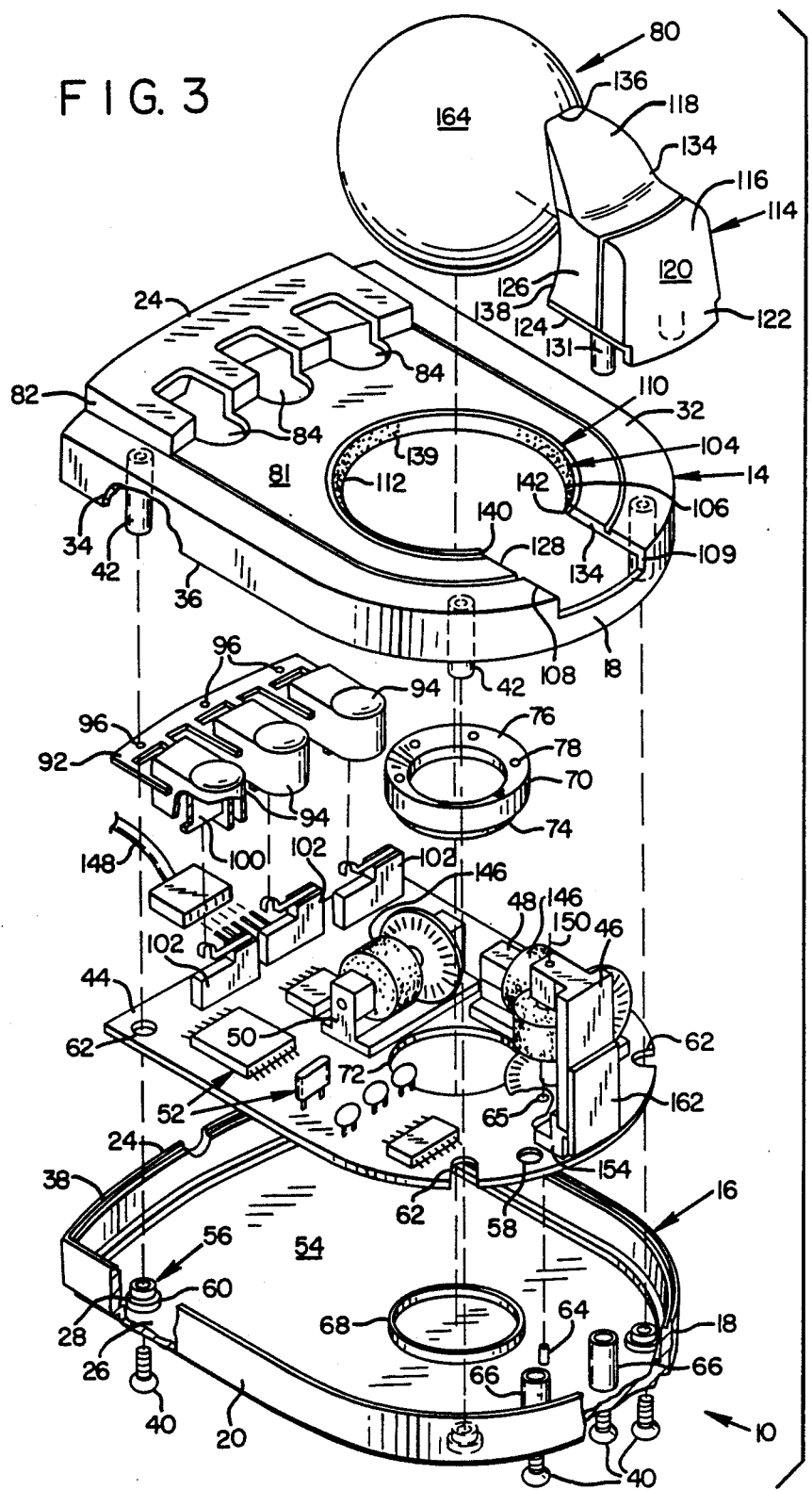
FIG. 3 is an exploded perspective view of the trackball mechanism.
Figure 4:
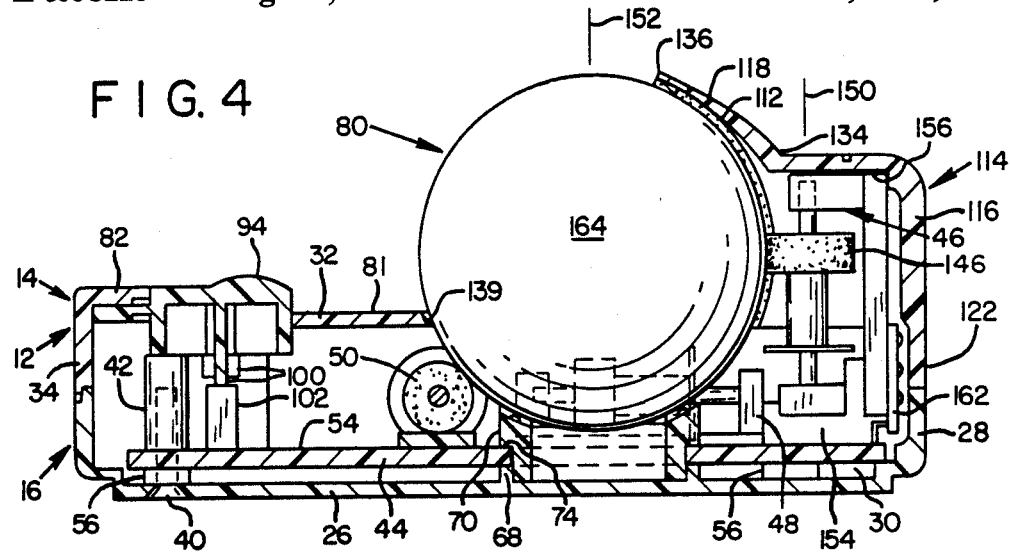
FIG. 4 is a section view of the trackball mechanism taken along line 4—4 of FIG. 1.
Figure 5:
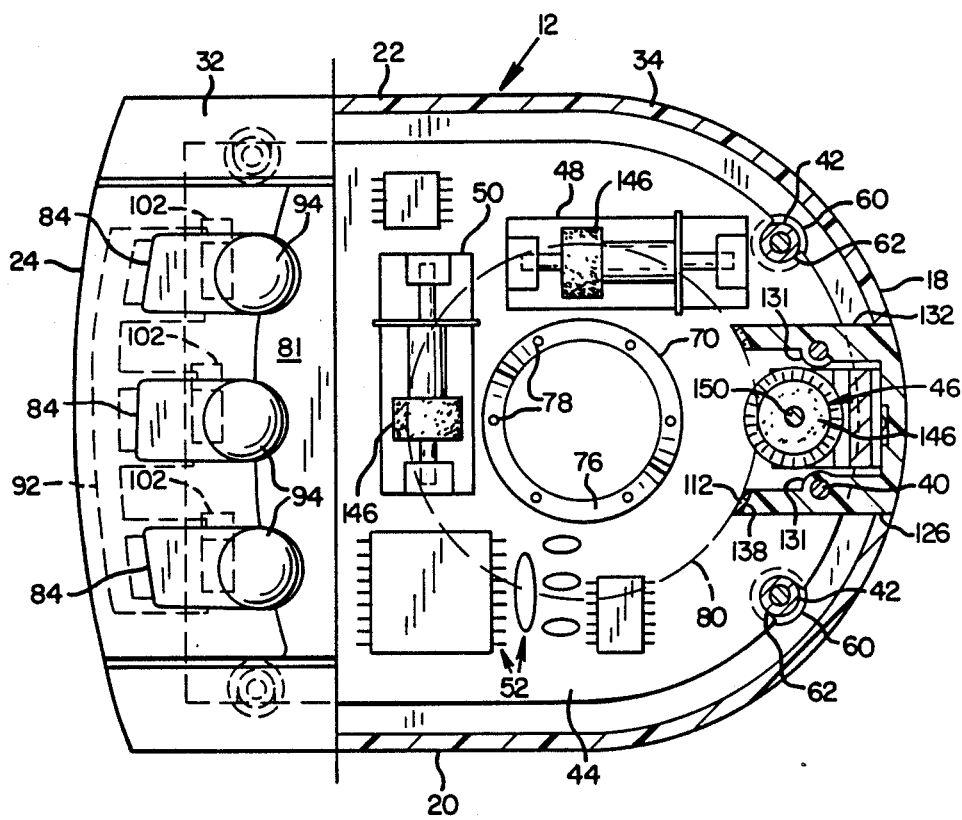
FIG. 5 is a section view of the trackball mechanism taken along line 5—5 of FIG. 2. For clarity, the ball is shown in broken line.

The upper surface 54 of the bottom plate 26 includes raised components that serve to fix the position of the circuit board 44 relative to the housing 12. In this regard, a raised annulus 56 is formed around each hole through which the fasteners 40 extend. Each annulus 56 is grooved at its upper end to form a shoulder 60 (FIG. 3). The circuit board 44 has openings 62 formed in locations that lie above the annuli 56. The openings 62 are sized so that the circuit board 44 rests upon the shoulders 60 of the annuli 56.

A registration pin 64 is fixed to the upper surface 54 of the bottom plate 26 near the front 18 thereof. The pin 64 mates with a correspondingly sized hole 65 in the circuit board 44.

Two tubular spacers 66 project upwardly from the upper surface 54 of the bottom plate 26 and pass through aligned holes 58 in the circuit board 44. The tubular spacers 66 are employed for securing the retainer 114 to the housing 12, as described more fully below.

A raised circular rim 68 is formed in the bottom plate upper surface 54 and is centered between the sides 20, 22 of the housing 12. The rim center is located at approximately three-eighths of the distance from the front 18 to the back 24 of the housing 12. The rim 68 primarily serves as a mechanism for securing a ring bearing 70 to the housing 12, as described more fully below.

A circular aperture 72 (FIG. 3) is formed in the circuit board 44 and is concentric with the rim 68. The diameter of the aperture 72 and the internal diameter of the rim 68 are substantially identical. Accordingly, the portion of the circuit board 44 that surrounds the aperture 72 rests upon the top surface of the rim 68.

With the circuit board 44 positioned over the recess 30, the lower portion of the ring bearing 70 is press fit into the rim 68. The outside diameter of the lower portion of the ring bearing 70 is slightly smaller than the outside diameter of the contiguous upper portion of the ring bearing 70. Accordingly, a shoulder 74 is formed in the ring bearing 70 to press upon the portion of the circuit board 44 that surrounds the aperture 72.

The top of the ring bearing 70 is bevelled to slope downwardly and inwardly, the sloping surface 76 carrying a plurality of ball bearings 78. The ball bearings 78 are spaced along the sloping surface 76 to support the ball 80 for rotation relative to the housing 12.

The upper surface 81 of the housing top plate 32 is generally flat, except for a raised region 82 near the back 24 of the housing 12. Three apertures 84 are formed in the top plate 32 of the housing, each aperture 84 extending partly through the raised region 82 and partly through the portion of the top plate 32 that is adjacent to the raised region 82.

A key plate 92 that carries three movable keys 94 is fastened to the underside of the raised region 82 of the housing top plate 32. Three holes 96 are formed in the key plate 92, the holes 96 mating with pegs (not shown) that are fixed to the underside of the top plate 32 beneath the raised region 82. The key plate 92 is bonded to the housing top plate 32 with the keys 94 disposed within the apertures 84.

A tab 100 is attached to the bottom of each key 94. Each tab 100 is aligned with a microswitch 102 that is mounted to the circuit board 44. Whenever a key 94 is depressed by the user, an associated microswitch 102 is activated. The microswitches 102 are associated with the remaining circuit components 52 to permit, for example, selection of different operating modes of the trackball mechanism 10.

An opening 104 (FIG. 3) is formed in the top plate 32 near the curved front 18 of the housing 12. The opening 104 has a circular part 106 and a contiguous generally rectangular part 108 that extends between the circular part 106 and the front 18 of the housing 12. The rectangular part 108 of the opening 104 is shaped to define a notch 109 that extends into the sidewall 34 of the top plate 32.

The edge 110 of the top plate 32 at the circular part 106 of the opening 104 defines an arc of constant radius that is centered about a line that passes through the center of the ring bearing 70. That edge 110 is sloped downwardly and inwardly, and is lined with felt 112 that is coated with low-friction material such as that manufactured under the trademark Teflon by E.I. DuPont de Nemours & Co.

The ball 80, which can be any suitable rigid sphere such as glass or hard plastic, rests upon the ball bearings 78 in slight contact with the coated felt 112. The coated felt 112 acts as a low-friction seal, preventing airborne dust or other matter from passing between the ball 80 and the housing 12.

It is noteworthy that the radius of the arced edge 110 is shorter than the radius of the ball 80. In a preferred embodiment, the radius of the arced edge 110 is approximately 10% shorter than the radius of the ball 80. Accordingly, approximately 72% of the ball surface area is exposed above the flat upper surface 81 of the top plate 32.

As noted, the ball 80 is secured to the housing 12 by the retainer 114. The retainer 114 is attached to the top shell 14 near the front center thereof. The retainer 114 includes a substantially hollow box-like base 116 with an integrally formed solid tongue 118 that projects upwardly therefrom. As best shown in FIG. 3, the base 116 has a front wall 120 that includes a tab 122 extending from its bottom. The tab 122 fits into the notch 109 that is formed in the top shell sidewall 34.

The lower edge 124 of the left wall 126 of the retainer 114 is rabbeted so that it abuts the left edge 128 of the rectangular part 108 of the opening 104. Similarly, the lower edge 130 of the right wall 132 of the retainer 114 is rabbeted so that it abuts the right edge 134 of the rectangular part 108 of the opening 104.

The left wall 126 and the right wall 132 of the retainer base 116 are thickened in part to form a post 131 in each wall 126, 132. Each post 131 extends below the retainer base 116 and through the rectangular part 108 of the opening 104 to abut the upper end of a tubular spacer 66 that is attached to the bottom plate 26. A fastener 40 is threaded through each spacer 66 and abutting post 131 to secure the retainer 114 to the housing 12.

Figure 2:
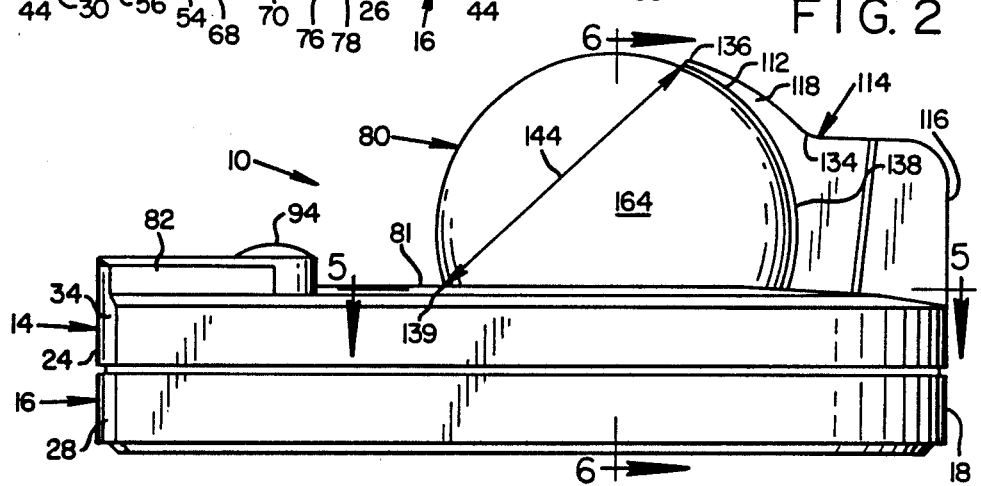
FIG. 2 is a side elevation view of the trackball mechanism.

The tongue 118 extends from the upper back edge 134 of the base 116. The tongue 118 is curved to conform to the shape of the ball 80 (FIG. 2). Further, the tongue is tapered from its bottom to its distal tip 136, the tapering being both in thickness (FIG. 2) and in width (FIG. 1).

The edge of the retainer 114 that faces the ball 80, hereafter referred to as the ball-facing edge 138, conforms to the shape of the ball 80. The ball-facing edge 138 extends along the left wall 126 of the retainer 114 from a terminus 140 of the arced edge 110 of the opening 104 in the top plate 32, across the tip 136 of the retainer tongue 118, and down the right wall 132 of the retainer 114 to the second terminus 142 of the arced edge 110 of opening 104.

The ball-facing edge 138 of the retainer 114 is lined with Teflon-coated felt 112 to provide the low-friction sealing function described earlier.

The ball 80 normally rests on the ring bearing 70. The ball 80 cannot, however, be removed from the housing 12 because the ball cannot fit through the space between the tip 136 of the retainer tongue 118 and the arced edge 110 of the top plate opening 104. In this regard, and as best shown in FIG. 2, the distance between the retainer tip 136 and the location 139 on the arced edge 110 that is farthest from the tip 136 (this distance shown as dimension line 144 in FIG. 2) is slightly less than the diameter of the ball 80.

The above-mentioned motion sensors 46, 48, 50 are preferably encoder-type, such as manufactured by Litton Industries of Chatsworth, Calif., model number 29746-005. Each motion sensor includes a rotatable polyurethane-foam wheel 146 that engages the surface of the ball 80. Whenever the ball 80 is rotated about an axis that is substantially parallel to the rotational axis of a foam wheel 146, the wheel 146 rotates with the ball 80, which in turn causes the associated encoder to generate output signals. The output signals are processed by the circuit components 52 and transmitted to the display controller via an associated bus 148.

The hollow base 116 of the retainer 114 provides space for one of the motion sensors 46. That sensor 46 is arranged so that the foam wheel 146 rides along the surface of the ball 80 and rotates about an axis 150 that is substantially parallel to the vertical rotational axis 152 of the ball 80. Put another way, the wheel 146 of sensor 46 rides along the ball circumference that is disposed in a plane that is perpendicular to the vertical axis 152 of the ball. Accordingly, output signals generated by the sensor 46 are representative of the vertical rotation of the ball 80.

The sensor 46 is held in place by a support block 154 that is fastened to the circuit board 44 between the holes 58 through which the tubular spacers 66 extend. The remaining sensors 48, 50 are mounted to the circuit board 44 with their foam wheels 146 rotatable along axes that are orthogonal to each other and to the axis of rotation 150 of the foam wheel 146 associated with the third sensor 46.

It can be appreciated that with the sensors 46, 48, 50 arranged as just described, the ball 80 can be rotated about any of three orthogonal axes to thereby activate only one sensor. For example, whenever the ball 80 is rotated about its vertical axis 152, only sensor 46 will be activated (that is, the foam wheel 146 of that sensor 46 will be rotated in response to the movement of the ball 80). The remaining sensors 48, 50 are not activated because the ball surface motion is perpendicular to the direction of rotation of their associated foam wheels 146.

For trackballs that detect ball movement in three axes, it is generally desirable to mount three sensors in the mutually orthogonal relationship just described. This relationship is desirable because the ball rotation about any one of the three axes can be determined with greater accuracy if only one sensor is activated.

In accordance with the present invention, the interior of the base 114 is shaped to stabilize and to provide clearance for the sensor 46. To this end, a recess 156 is formed in the interior top of the base 116 to accommodate the upper portion of the sensor 46 (FIG. 6). Further, another recess 158 is provided in the front wall 120 of the base 116 to provide clearance for a circuit board extension piece 162 (FIG. 4) that is attached to the sensor 46 and connected to the primary circuit board 44.

Even though it is desirable to locate the sensor 46 that is associated with the vertical rotational axis 152 of the ball 80 as just described, it is contemplated that the sensor could be located elsewhere, for example, beneath the top plate 32 of the housing 12. With such an arrangement, the overall size of the retainer 114 could be substantially reduced because the retainer 114 would not function to enclose the sensor 46. Regardless of the size of the retainer, however, the retainer should be arranged so that above-described distance 144 between the retainer tip 136 and the location 139 on the arced edge 110 that is farthest from the tip 136 is smaller than the ball diameter.

It can be appreciated that the configuration of the present trackball mechanism 10 is such that a very large segment 164 of the ball 80 protrudes above the housing 12 for manipulation by the user. For example, as shown in FIG. 6, the center of the ball 80 is disposed above the top plate 32 so that two diametrically opposed portions 166, 168 of the surface of the ball 80 are exposed for grasping by the user between finger 170 and thumb 172. Grasping such diametrically opposed portions 166, 168 permits the user to very precisely control the rotation of the ball 80 about the vertical axis 152 or about any other axis.

It is noteworthy that the position of the retainer 114 is such that it secures the ball 80 in place, while minimally interfering with the manipulation of the exposed portion of protruding segment 164 of the ball 80. In this regard, the retainer 114 is configured and arranged to cover only a portion of the ball segment 164 that faces the palm 174 of the user. The retainer 114, therefore, does not cover portions of the ball 80 that would normally be grasped by the user's fingers.

While preferred embodiments have been illustrated and described above, it will be appreciated by those of ordinary skill in the art that further changes can be made to those embodiments without departing from the spirit and scope of the invention.

I claim:

1. An improved trackball mechanism of the type in which a ball is rotatably supported for manipulation by the hand of a user, wherein the improvement comprises:
   a housing substantially enclosing a first segment of the ball so that a second segment of the ball protrudes from the housing; and
   retainer means for retaining the ball in position relative to the housing so that diametrically opposed portions of the second segment of the ball are exposed to the user for manipulation of the ball.

2. The improvement of claim 1 wherein the housing is configured so that the second segment of the ball is larger than the first segment of the ball.

3. The improvement of claim wherein the second segment of the ball includes approximately 72% of the ball surface area.

4. The improvement of claim 3 wherein the second segment of the ball protrudes through an opening defined by an edge of the housing, and wherein the retainer means includes a tongue that extends from the housing along one side of the second segment of the ball for securing the ball to the housing.

5. The improvement of claim 4 wherein the tongue has a distal tip, the distance between the tip and the location on the edge that is farthest from the tip being less than the ball diameter.

6. The improvement of claim 5 wherein the retainer means is configured for defining a space adjacent to the second segment of the ball.

7. The improvement of claim 6 wherein the ball is rotatable about a first axis that extends through the first and second segments of the ball, and wherein the space defined by the retainer means is adjacent to a part of the surface of the second segment, which part being intersected by a line extending through the center of the ball perpendicular to the first axis.

8. The improvement of claim 7 wherein the first axis is a vertical axis.

9. The improvement of claim 7 wherein the space is sized to accommodate a sensor for detecting motion of the ball about the first axis.

10. The improvement of claim 1 wherein the housing includes a front and a back, the back of the housing carrying keys that are depressible by the user, the retainer means being disposed at the front of the housing so that the ball is substantially between the keys and the retainer means.

11. The improvement of claim 10 wherein the second segment of the ball protrudes through an opening defined by an edge of the housing, and wherein the retainer means includes a tongue that extends from the front of the housing for securing the ball to the housing.

12. The improvement of claim 11 wherein the tongue has a distal tip, the distance between the tip and the location on the edge that is farthest from the tip being less than the ball diameter.

13. The improvement of claim 12 wherein the retainer means is configured and arranged to be adjacent to the palm of the user's hand whenever the ball is manipulated by the user.

14. An improved trackball mechanism of the type in which a ball is rotatably supported for manipulation by the hand of a user, the improvement comprising:
   a housing substantially enclosing a first segment of the ball so that a second segment of the ball protrudes from the housing; and
   retainer means for retaining the ball in position relative to the housing so that the second segment includes more of the surface area of the ball than the first segment.

15. The improvement of claim 14 wherein the second segment of the ball protrudes through an opening defined by an edge of the housing, and wherein the retainer means includes a tongue that extends from the housing along one side of the second segment of the ball for securing the ball to the housing.

16. The improvement of claim 15 wherein the tongue has a distal tip, the distance between the tip and the location on the edge that is farthest from the tip being less than the ball diameter.

17. The improvement of claim 16 wherein the retainer means is configured so that diametrically opposed portions of the second segment of the ball are exposed to the user for manipulation of the ball.

18. The improvement of claim 17 wherein the housing includes a front and a back, the back of the housing carrying keys that are depressible by the user, the retainer means being disposed at the front of the housing so that the ball is substantially between the keys and the retainer means.

19. The improvement of claim 18 wherein the second segment of the ball includes approximately 72% of the ball surface area.

20. A trackball mechanism comprising:
   a housing;
   a ball;
   bearing means mounted to the housing for supporting the ball and for permitting rotation of the ball relative to the housing, the housing having a top surface below which a first segment of the ball is substantially enclosed and above which a second segment of the ball protrudes, the center of the ball residing in the second segment of the ball.

21. The mechanism of claim 20 further comprising a retainer attached to the housing to extend from the first surface, the retainer being configured for retaining the ball in position relative to the housing.

22. The mechanism of claim 21 wherein the retainer is configured for exposing diametrically opposed portions of the surface of the second segment of the ball.

23. The mechanism of claim 22 wherein the retainer includes a substantially hollow base that defines a space adjacent to the second segment of the ball.

24. The mechanism of claim 23 wherein the ball is rotatable about a first axis that extends through the first and second segments of the ball, and wherein the space defined by the retainer base is adjacent to a part of the surface of the second segment, which part being intersected by a line extending through the center of the ball perpendicular to the first axis.

25. The mechanism of claim 24 wherein the first axis is a vertical axis.

26. The mechanism of claim 24 wherein the space is sized to accommodate a sensor for detecting motion of the ball about the first axis.

27. The mechanism of claim 22 wherein the second segment of the ball includes approximately 72% of the ball surface area.

28. The mechanism of claim 21 wherein the housing includes a front and a back, the back of the housing carrying keys that are depressible by the user, the retainer means being disposed at the front of the housing so that the ball is substantially between the keys and the retainer means.

29. The mechanism of claim 28 wherein the second segment of the ball protrudes through an opening defined by an edge of the housing, and wherein the retainer means includes a tongue that extends from the front of the housing for securing the ball to the housing.

30. The mechanism of claim 29 wherein the tongue has a distal tip, the distance between the tip and the location on the edge that is farthest from the tip being less than the ball diameter.

31. The mechanism of claim 30 wherein the retainer is configured and arranged to be adjacent to the palm of the user's hand whenever the ball is manipulated by the user.

* * * * *